(12) United States Patent
Li et al.

(10) Patent No.: US 11,984,263 B2
(45) Date of Patent: May 14, 2024

(54) PRESSURE PROTECTOR FOR HIGH-VOLTAGE SELF-HEALING CAPACITOR

(71) Applicant: WUXI POWER FILTER CO., LTD., Wuxi (CN)

(72) Inventors: Yinda Li, Wuxi (CN); Yimin Yang, Wuxi (CN); Xiaowu Sun, Wuxi (CN); Chongfeng Cao, Wuxi (CN); Yuan Feng, Wuxi (CN)

(73) Assignee: WUXI POWER FILTER CO., LTD., Jiangsu (CN)

( * ) Notice: Subject to any disclaimer, the term of this patent is extended or adjusted under 35 U.S.C. 154(b) by 235 days.

(21) Appl. No.: 17/655,460

(22) Filed: Mar. 18, 2022

(65) Prior Publication Data
US 2023/0010387 A1 Jan. 12, 2023

Related U.S. Application Data

(63) Continuation of application No. PCT/CN2021/138991, filed on Dec. 17, 2021.

(30) Foreign Application Priority Data

Jul. 12, 2021 (CN) .......................... 202110782483.5

(51) Int. Cl.
*H01G 4/015* (2006.01)
*H01G 2/14* (2006.01)
*H01G 4/224* (2006.01)

(52) U.S. Cl.
CPC ............... *H01G 4/015* (2013.01); *H01G 2/14* (2013.01); *H01G 4/224* (2013.01)

(58) Field of Classification Search
CPC .................................. H01G 4/015; H01G 2/14
See application file for complete search history.

(56) References Cited

FOREIGN PATENT DOCUMENTS

| CN | 2390269 Y | * 8/2000 | |
| CN | 107481856 A | * 12/2017 | ............... H01G 2/14 |
| CN | 107481856 A | 12/2017 | |
| CN | 112490002 A | * 3/2021 | ............. G01L 13/00 |

* cited by examiner

*Primary Examiner* — David M Sinclair
(74) *Attorney, Agent, or Firm* — Greer Burns & Crain Ltd.

(57) ABSTRACT

A pressure protector for a high-voltage self-healing capacitor. is composed of a box shell, a cover plate, a core, filled resin, a pressure protector and wiring terminals. The pressure protector is arranged in the capacitor, and the pressure protector is mainly composed of fixed studs, a protector shell, a movable bolt assembly, a fixed electrode assembly, a movable electrode assembly, first fixed bolts and a limiting bolt. The pressure protector for a high-voltage self-healing capacitor is simple in structure and convenient to install and use, the technical problem of relay protection of internal faults of the self-healing capacitor can be solved. Accidents can be effectively avoided, and the requirement for safe operation of the capacitor can be met.

4 Claims, 7 Drawing Sheets

PRESSURE PROTECTOR FOR HIGH-VOLTAGE SELF-HEALING CAPACITOR

CROSS REFERENCE TO RELATED APPLICATION(S)

This patent application claims the benefit and priority of Chinese Patent Application No. 202110782483.5 filed on Jul. 12, 2021 and entitled "PRESSURE PROTECTOR FOR HIGH-VOLTAGE SELF-HEALING CAPACITOR", the disclosure of which is incorporated by reference herein in its entirety as part of the present application.

TECHNICAL FIELD

The present disclosure belongs to the field of power capacitor manufacturing, and specifically relates to a pressure protector for a high-voltage self-healing capacitor.

BACKGROUND ART

The dry type high-voltage self-healing parallel capacitor is free of oil in a box shell, can prevent harm caused by medium weakness and partial discharge by virtue of the self-healing characteristic of the dry type high-voltage self-healing parallel capacitor, can reliably operate, and is suitable for being installed in urban underground transformer substations, indoor transformer substations of large buildings and key fireproof places.

The capacitor has a self-healing function for breakdown in an extremely small range caused by dielectric weak points and partial discharge, so that the capacitor has a certain fault protection capability, and can operate under high electric field intensity. Under the action of overhigh thermal stress and electric stress, when medium accelerated aging of the capacitor causes large-area breakdown and cannot be self-healed, the medium at the breakdown part is decomposed by an electric arc to generate a large amount of gas, so that the internal pressure of the capacitor is rapidly increased, a shell is bulged and even bursts, and other equipment is possibly damaged. When the internal medium of the metallic self-healing capacitor element is broken down in a large area, electrodes are mainly connected by the electric arc, the short circuit is unstable, the electric arc resistance is relatively large, and the reflected capacitance change is not obvious, so that the fault signal is easily annihilated due to false appearance such as small capacitance change although the capacitor has a serious fault and has a risk of bursting. This situation is different from the metallic short-circuiting of foil type capacitors, resulting in difficulties for the backup relay protection of the capacitor device. Therefore, relay protection of internal faults of the dry type high-voltage self-healing parallel capacitor is an unsolved problem, and sensitive and reliable relay protection is crucial to safe operation of the capacitor.

At present, a low-voltage self-healing capacitor used in a power system with the voltage level of 1 kV or below usually uses a pressure protection method, and the protection method mainly depends on the deformation of a capacitor shell to break a current connecting piece inside, so that a power supply is cut off, and the capacitor is made to quit operation. However, the high-voltage parallel capacitor is applied to the voltage levels of 6 kV, 10 kV and 35 kV. If the current connecting piece is broken inside, the insulation distance of the fracture and the shape of the fracture cannot meet the requirement for isolating high voltage. After-burning or re-breakdown occurs between the fractures, and generated high-power overvoltage can harm electrical equipment in the system. Therefore, the broken type protection device is not suitable for use in the high-voltage self-healing parallel capacitor.

The document CN107481856A discloses a fault signal booster for a high-voltage self-healing capacitor. The fault signal booster only acts when the expansion of a shell exceeds a certain size, and the fault signal booster is placed in the middle of the capacitor When the fault points of the high-voltage self-healing capacitor are at four corners of the shell, the fault signal booster also has the possibility of delayed action. In addition, the product structure can also affect the production efficiency of the high-voltage self-healing capacitor.

In conclusion, due to the particularity of the material, structure and working principle of the dry type high-voltage self-healing parallel capacitor, besides the self-healing performance of the internal fault protection, the relay protection of the internal fault protection is a key technical problem needing to be solved for safe operation.

SUMMARY

Aiming at the requirement of relay protection for internal faults of a parallel capacitor of a power system, the present disclosure provides a pressure protector for a high-voltage self-healing capacitor (hereinafter referred to as a capacitor).

The technical scheme adopted by the present disclosure is as follows:

The present disclosure provides a pressure protector for a high-voltage self-healing capacitor. The capacitor is composed of a box shell, a cover plate, a core, filled resin, a pressure protector and wiring terminals, wherein the pressure protector is arranged in the capacitor.

The pressure protector is mainly composed of fixed studs, a protector shell, a movable bolt assembly, a fixed electrode assembly, a movable electrode assembly, first fixed bolts and a limiting bolt. The protector shell is L-shaped. A circular step groove with the depth of 2 mm and a cylindrical cavity with the depth of 40 mm are sequentially formed in the middle of the upper portion of the protector shell, notches with the depth of 2 mm are formed in the circular step groove and the outer surface of the protector shell, and four longitudinal cylindrical through holes are formed in the periphery of the protector shell. A U-shaped groove is formed in the bottom of the protector shell and connected with a transverse cylindrical through hole, and a square hole is formed between the cavity and the transverse cylindrical through hole. The protector shell is made of polycarbonate and is formed into a whole through die stamping. The movable bolt assembly comprises a circular ring, a spring tube, a stainless steel gasket, a bolt body and an epoxy gasket. The fixed electrode assembly comprises a fixed electrode body, a second fixed bolt and a fixed lead-out wire. The movable electrode assembly comprises a movable electrode body, a movable electrode, an inner connecting wire, a spring, third fixed bolts and a movable lead-out wire. One end of each of the fixed studs is welded with the cover plate, and the other ends of the fixed studs are arranged in the longitudinal cylindrical through holes of the protector shell and fixed through the first fixed bolts. The circular ring of the movable bolt assembly and the cover plate are welded together and clamped in the circular step groove. The spring tube, the stainless steel gasket and the epoxy gasket of the movable bolt assembly are all arranged in the cylindrical cavity of the protector shell, and the bolt body is inserted into the transverse cylindrical through hole of the protector shell through the square hole. The fixed lead-out wire of the fixed electrode assembly is connected with the wiring terminals of the capacitor, one end of the fixed electrode body is placed in the U-shaped groove of the protector shell, and the other end of the fixed electrode body is connected with one end of the transverse cylindrical through hole in a threaded fit mode. The movable electrode, the inner connecting wire and the spring of the movable electrode assembly are placed in the transverse cylindrical through hole, the movable electrode body part of the movable electrode assembly is placed in the transverse cylindrical through hole and positioned through the limiting bolt, and the movable lead-out wire of the movable electrode assembly is connected with the wiring terminals of the capacitor.

The circular ring, the spring tube and the stainless steel gasket of the movable bolt assembly are sequentially connected into a whole through welding, and the stainless steel gasket, the epoxy gasket and the bolt body are connected in a threaded fit mode and coated with sealant. The circular ring, the spring tube and the stainless steel gasket are made of stainless steel. The bolt body is made of epoxy resin, the upper end of the bolt body is cylindrical, and the lower end of the bolt body is cuboid.

The fixed electrode body of the fixed electrode assembly and the fixed lead-out wire of the fixed electrode assembly are fastened and connected through the second fixed bolt. The fixed electrode body is made of brass, the upper end of the fixed electrode body is a cube, the middle of the fixed electrode body is a cylinder, and the bottom of the fixed electrode body is a cylinder with threads. The fixed lead-out wire is an insulated multi-strand tinned soft copper wire.

The movable electrode body of the movable electrode assembly, the inner connecting wire sleeved with a compressed spring and the movable electrode are sequentially fastened and connected through third fixed bolts. The movable electrode body and the movable lead-out wire are also fastened and connected through a third fixed bolt. The movable electrode is made of brass. The movable electrode body is made of brass, and the movable electrode body is a T-shaped cylinder. The movable lead-out wire is an insulated multi-strand tinned soft copper wire.

The fixed stud is made of stainless steel, and the fixed stud is a cylinder with the outer diameter of 8 mm and the inner diameter of M6 threads.

The first fixed bolts and the limiting bolt are of inner hexagonal structures with M6 threads.

Under the normal operation condition of the capacitor, the movable electrode is blocked by the bolt body in the transverse cylindrical through hole and keeps enough insulation distance with the corresponding fixed electrode body. The spring is compressed, and the pressure protector is in an open-circuit state. When the capacitor breaks down and the internal pressure of the capacitor is gradually increased, the spring tube of the movable bolt assembly is gradually compressed, the bolt body is slowly moved upwards by the pressure. When the pressure reaches a certain set value and the bottom of the bolt body is just flush with the bottom of the square hole, the spring is released to quickly drive the movable electrode to be close to the fixed electrode, and the pressure protector is in a short-circuit state.

Because the movable electrode body and the fixed electrode body are respectively connected to the two wiring terminals of the capacitor, a short circuit is formed between the terminals of the capacitor. The metallic reliable short circuit can enable a capacitor bank to generate large enough unbalanced voltage or current. Backup relay protection can smoothly detect the unbalanced voltage or current, and the circuit breaker is driven to act, so that a faulty capacitor device is cut off, and accidents caused by capacitor burst are prevented.

The pressure protector has the beneficial effects that according to the material, structure and characteristics of a dry type high-voltage self-healing parallel capacitor, the technical problem of relay protection of internal faults of the self-healing capacitor can be solved by adopting the pressure protector, and accidents are effectively avoided.

The pressure protector is simple in structure, convenient to install and use and capable of meeting the requirement for safe operation of the capacitor.

Reference signs: 1, box shell; 3, cover plate; 3, core; 4, filled resin; 5, pressure protector; 6, wiring terminal;

51, fixed bolt; 52, protector shell; 53, movable bolt assembly; 54, fixed electrode assembly; 55, movable electrode assembly; 56, first fixed bolt; 57, limiting bolt;

531, circular ring; 532, spring tube; 533, stainless steel gasket; 534, bolt body; 535, epoxy gasket;

541, fixed electrode body; 542, second fixed bolt; 543, fixed lead-out wire;

551, movable electrode body; 552, movable electrode; 553, inner connecting wire; 554, spring; 555, third fixed bolt; and 556, movable lead-out wire.

DETAILED DESCRIPTION OF THE EMBODIMENTS

The present disclosure is further described in conjunction with the attached figures and specific embodiments.

Figure 1:
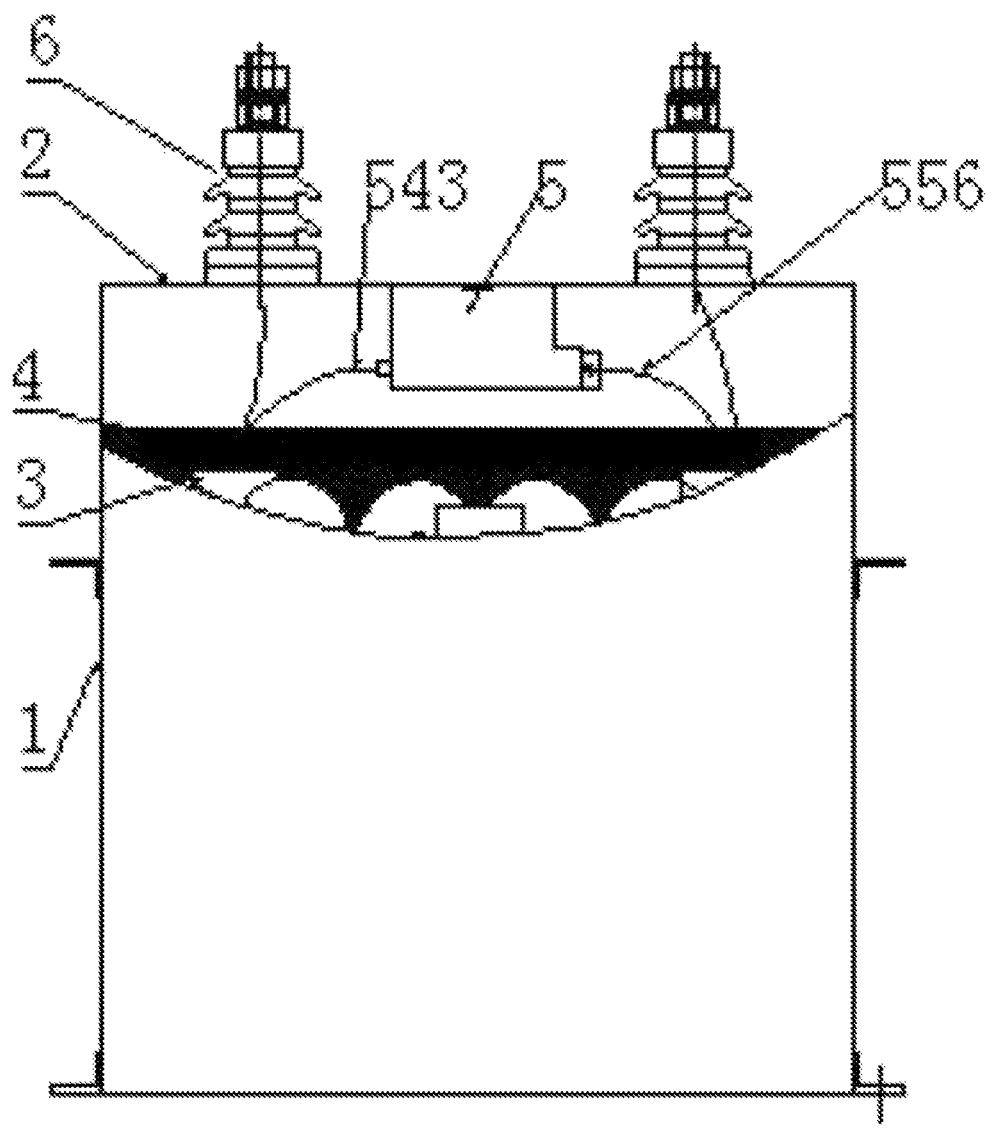
FIG. 1 is a schematic diagram of a pressure protector installed in a capacitor.
Figure 2:
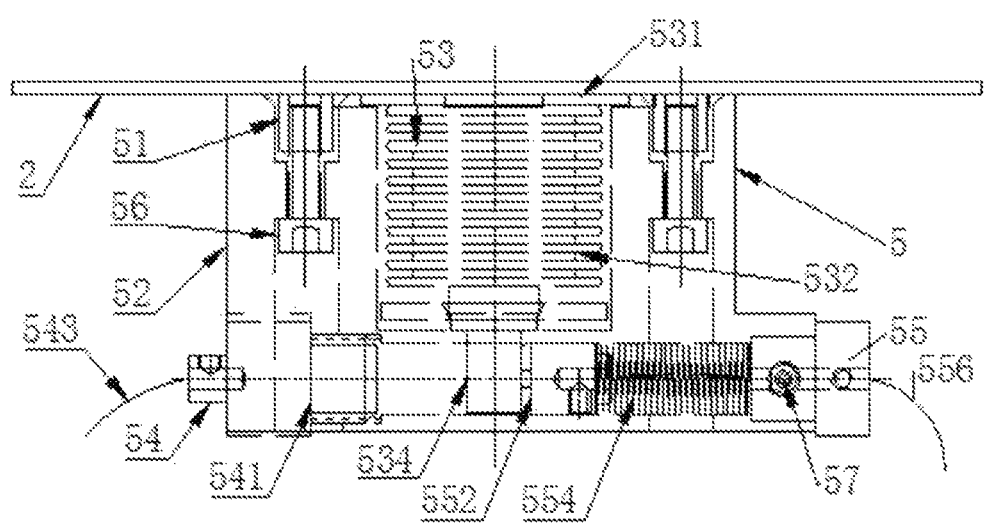
FIG. 2 is a structural schematic diagram of a pressure protector.
Figure 3:
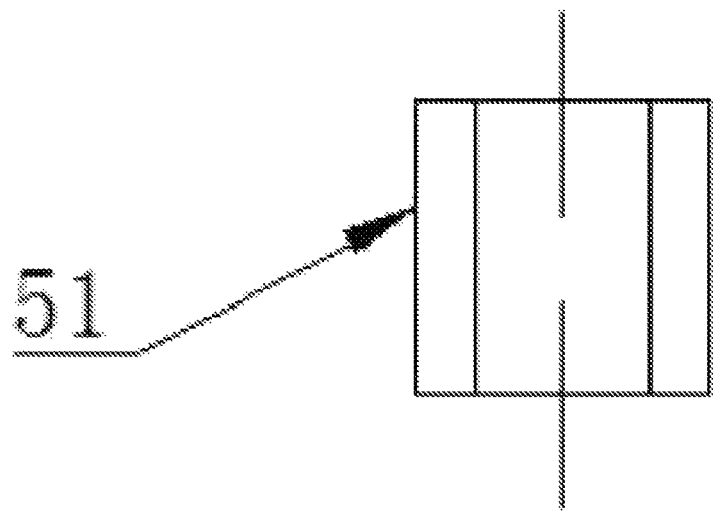
FIG. 3 is a schematic diagram of a fixed bolt.
Figure 4:
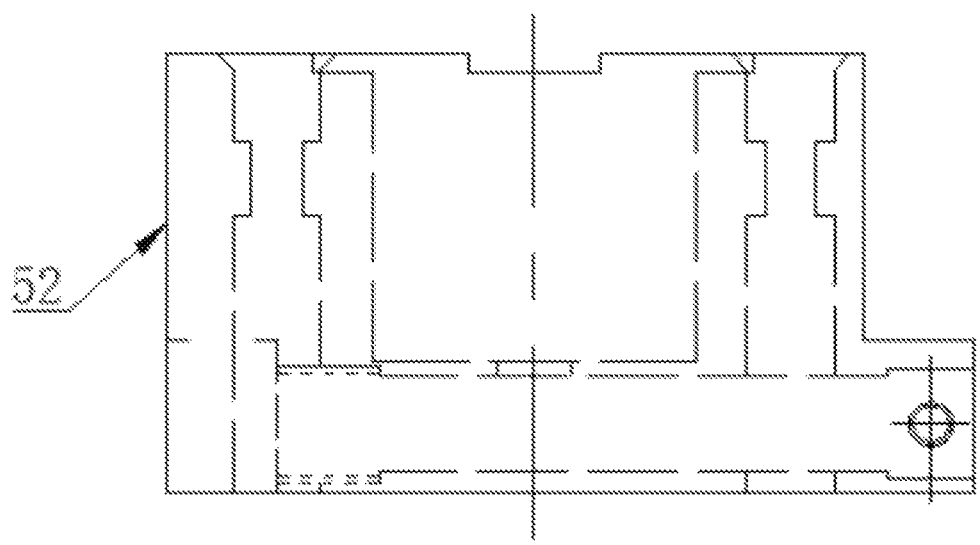
FIG. 4 is a schematic diagram of a protector shell.
Figure 5:
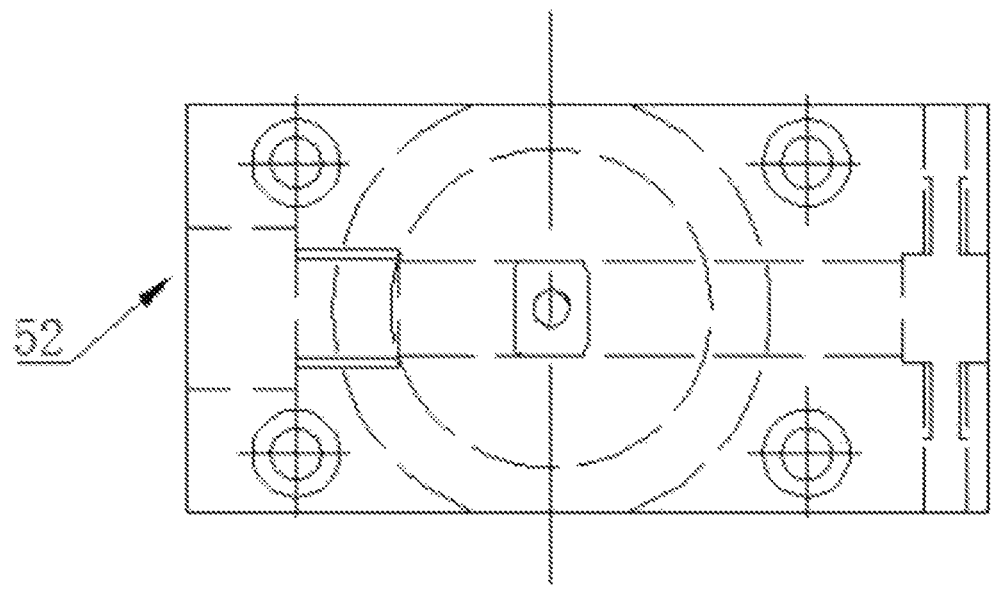
FIG. 5 is a top view of FIG. 4.
Figure 6:
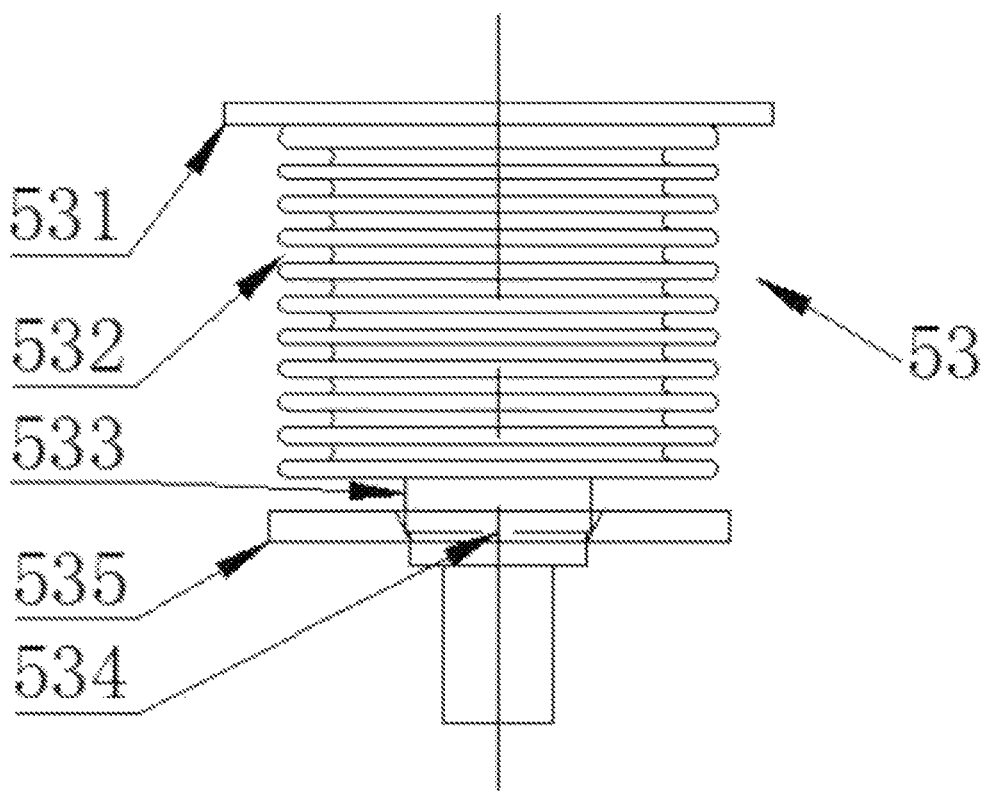
FIG. 6 is a schematic diagram of a movable bolt assembly.
Figure 7:
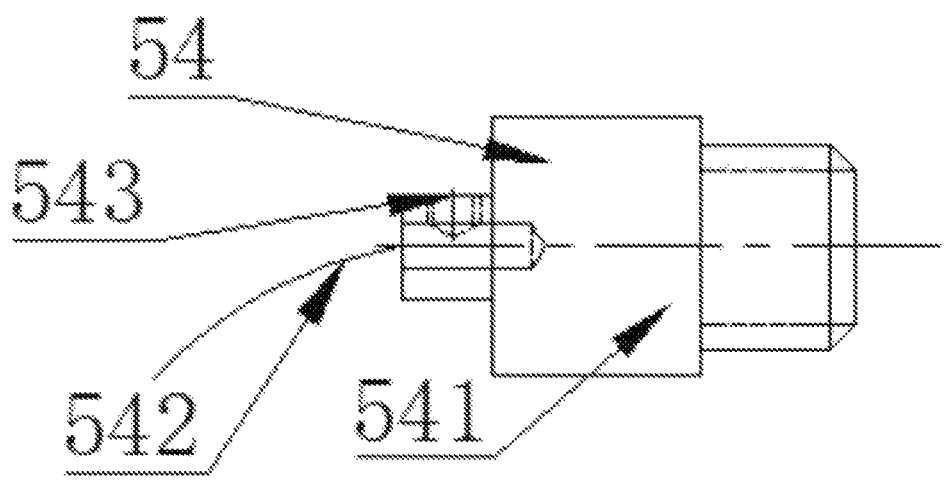
FIG. 7 is a schematic diagram of a fixed electrode assembly.
Figure 8:
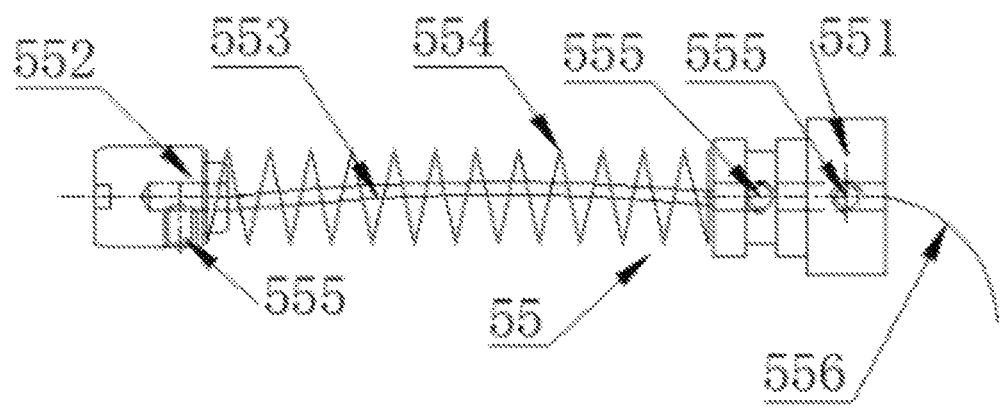
FIG. 8 is a schematic diagram of a movable electrode assembly.
Figure 9:
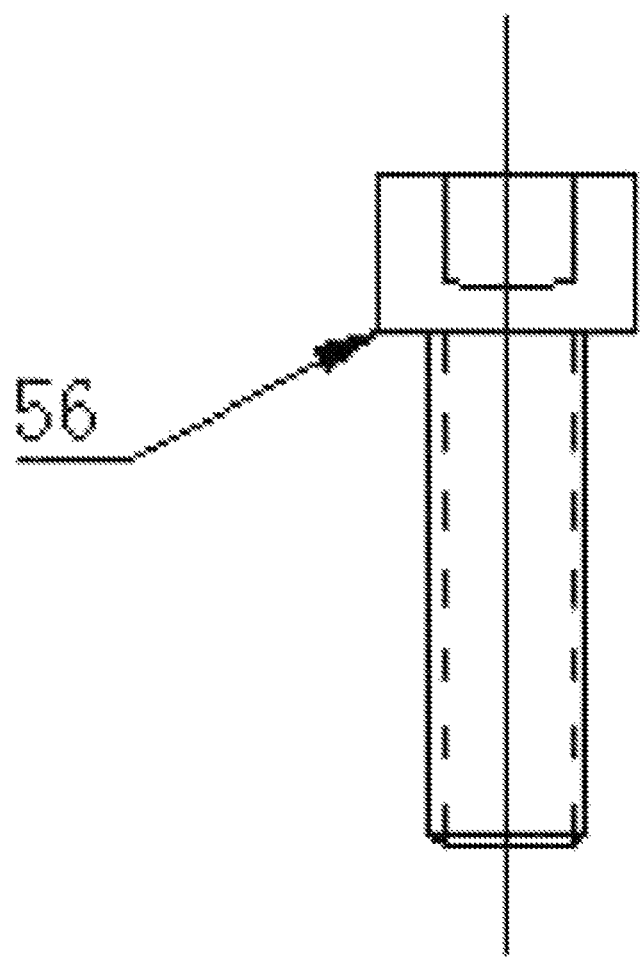
FIG. 9 is a schematic diagram of a first fixed bolt.
Figure 10:
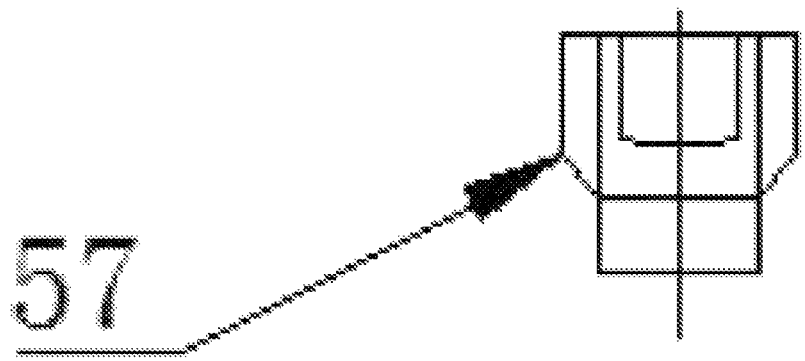
FIG. 10 is a schematic diagram of a limiting bolt.

As shown in FIG. 1, a capacitor is composed of a box shell 1, a cover plate 2, a core 3, filled resin 4, a pressure protector 5 and wiring terminals 6, the pressure protector is arranged in the capacitor, and a fault signal booster 5 is connected to the two wiring terminals 6 of the capacitor.

As shown in FIG. 2 to FIG. 10, the pressure protector 5 is mainly composed of fixed studs 51, a protector shell 52, a movable bolt assembly 53, a fixed electrode assembly 54, a movable electrode assembly 55, first fixed bolts 56 and a limiting bolt 57.

The protector shell 52 is L-shaped. A circular step groove with the depth of 2 mm and a cylindrical cavity with the depth of 40 mm are sequentially formed in the middle of the upper portion of the protector shell. Notches with the depth of 2 mm are formed in the circular step groove and the outer surface of the protector shell 52. Four longitudinal cylindrical through holes are formed in the periphery of the protector shell, and a U-shaped groove is formed in the bottom of the protector shell and connected with a transverse cylindrical through hole. A square hole is formed between the cavity and the transverse cylindrical through hole. The protector shell is made of polycarbonate and is formed into a whole through die stamping. The movable bolt assembly 53 comprises a circular ring 531, a spring tube 532, a stainless steel gasket 533, a bolt body 534 and an epoxy gasket 535. The fixed electrode assembly 54 comprises a fixed electrode body 541, a second fixed bolt 542 and a fixed lead-out wire 543; and the movable electrode assembly 55 comprises a movable electrode body 551, a movable electrode 552, an inner connecting wire 553, a spring 554, third fixed bolts 555 and a movable lead-out wire 556.

One end of each of the fixed studs 51 is welded with the cover plate 2, and the other ends of the fixed studs 51 are arranged in the longitudinal cylindrical through holes of the protector shell 52 and fixed through the first fixed bolts 56. The circular ring 531 of the movable bolt assembly 53 and the cover plate 2 are welded together and clamped in the circular step groove, the spring tube 532. The stainless steel gasket 533 and the epoxy gasket 535 of the movable bolt assembly 53 are all arranged in the cylindrical cavity of the protector shell 52, and the bolt body 534 is inserted into the transverse cylindrical through hole of the protector shell 52 through the square hole. The fixed lead-out wire 543 of the fixed electrode assembly 54 is connected with wiring terminals 6 of the capacitor. One end of the fixed electrode body 541 is placed in the U-shaped groove of the protector shell 52, and the other end of the fixed electrode body 541 is connected with one end of the transverse cylindrical through hole in a threaded fit mode. The movable electrode 552, the inner connecting wire 553 and the spring 554 of the movable electrode assembly 55 are placed in the transverse cylindrical through hole. The movable electrode body 551 part of the movable electrode assembly 55 is placed in the transverse cylindrical through hole and positioned through the limiting bolt 57, and the movable lead-out wire 556 of the movable electrode assembly 55 is connected with the wiring terminals of the capacitor.

The circular ring 531, the spring tube 532 and the stainless steel gasket 533 of the movable bolt assembly 53 are sequentially connected into a whole through welding, and the stainless steel gasket 533, the epoxy gasket 535 and the bolt body 534 are connected in a threaded fit mode and coated with sealant. The circular ring 531, the spring tube 532 and the stainless steel gasket 533 are made of stainless steel. The bolt body 534 is made of epoxy resin, the upper end of the bolt body is cylindrical, and the lower end of the bolt body is cuboid.

The fixed electrode body 541 of the fixed electrode assembly 54 and the fixed lead-out wire 543 of the fixed electrode assembly 54 are fastened and connected through the second fixed bolt 542. The fixed electrode body 541 is made of brass, the upper end of the fixed electrode body is a cube, the middle of the fixed electrode body is a cylinder, and the bottom of the fixed electrode body is a cylinder with threads. The fixed lead-out wire 543 is an insulated multi-strand tinned soft copper wire.

The movable electrode body 551 of the movable electrode assembly 55, the inner connecting wire 553 sleeved with a compressed spring 554 and the movable electrode 552 are sequentially fastened and connected through third fixed bolts 555, and the movable electrode body 551 and the movable lead-out wire 556 are also fastened and connected through a third fixed bolt 555. The movable electrode 552 is made of brass.

The movable electrode body 551 is made of brass, and is a T-shaped cylinder. The movable lead-out wire 556 is an insulated multi-strand tinned soft copper wire.

The fixed stud 1 is made of stainless steel, and is a cylinder with the outer diameter of 8 mm and the inner diameter of M6 threads.

The first fixed bolts 56 and the limiting bolt 57 are of inner hexagonal structures with M6 threads.

Under the normal operation condition of the capacitor, the movable electrode 552 is blocked by the bolt body 534 in the transverse cylindrical through hole and keeps enough insulation distance with the corresponding fixed electrode body 541. The spring 554 is compressed, and the pressure protector 5 is in an open-circuit state. When the capacitor breaks down and the internal pressure of the capacitor is gradually increased, the spring tube 532 of the movable bolt assembly 53 is gradually compressed. The bolt body 534 is slowly moved upwards by the pressure, and when the pressure reaches a certain set value and the bottom of the bolt body 534 is just flush with the bottom of the square hole, the spring 554 is released to quickly drive the movable electrode 552 to be close to the fixed electrode 54, and the pressure protector 5 is in a short-circuit state.

Because the movable electrode assembly 55 and the fixed electrode assembly 54 are respectively connected to the two wiring terminals 6 of the capacitor, a short circuit is formed between the terminals of the capacitor. The metallic reliable short circuit can enable a capacitor bank to generate large enough unbalanced voltage or current, backup relay protection can smoothly detect the unbalanced voltage or current, and the circuit breaker is driven to act, so that a faulty capacitor device is cut off, and accidents caused by capacitor burst are prevented.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A pressure protector for a high-voltage self-healing capacitor, the pressure protector being installed in the high-voltage self-healing capacitor, wherein the pressure protector comprises:
   fixed studs,
   a protector shell,
   a movable bolt assembly,
   a fixed electrode assembly,
   a movable electrode assembly,
   first fixed bolts and a limiting bolt;
   wherein the protector shell is L-shaped,
   a circular step groove with a depth of 2 mm and a cylindrical cavity with a depth of 40 mm being sequentially formed in the middle of an upper portion of the protector shell,
   notches with a depth of 2 mm being formed in the circular step groove and the outer surface of the protector shell,
   four longitudinal cylindrical through holes being formed in the periphery of the protector shell,
   a U-shaped groove being formed in bottom of the protector shell and connected with a transverse cylindrical through hole,
   a square hole being formed between the cylindrical cavity and the transverse cylindrical through hole, and the protector shell being made of polycarbonate and being formed into a whole through die stamping;

the movable bolt assembly including a circular ring, a spring tube, a stainless steel gasket, a bolt body and an epoxy gasket;

the fixed electrode assembly including a fixed electrode body, a second fixed bolt and a fixed lead-out wire;

the movable electrode assembly having a movable electrode body, a movable electrode, an inner connecting wire, a spring, third fixed bolts and a movable lead-out wire;

one end of each of the fixed studs being welded with a cover plate, and another end of each of the fixed studs being arranged in a corresponding one of the longitudinal cylindrical through holes of the protector shell and fixed through a corresponding one of the first fixed bolts;

the circular ring of the movable bolt assembly and the cover plate being welded together and clamped in the circular step groove, the spring tube, the stainless steel gasket and the epoxy gasket of the movable bolt assembly all being arranged in the cylindrical cavity of the protector shell, and the bolt body being inserted into the transverse cylindrical through hole of the protector shell through the square hole;

the fixed lead-out wire of the fixed electrode assembly being connected with wiring terminals of the capacitor, one end of the fixed electrode body being placed in the U-shaped groove of the protector shell, and another end of the fixed electrode body being connected with one end of the transverse cylindrical through hole in a threaded fit mode; and the movable electrode, the inner connecting wire and the spring of the movable electrode assembly being placed in the transverse cylindrical through hole, the movable electrode body part of the movable electrode assembly being placed in the transverse cylindrical through hole and positioned through the limiting bolt, and the movable lead-out wire of the movable electrode assembly being connected with the wiring terminals of the capacitor.

2. The pressure protector for a high-voltage self-healing capacitor according to claim 1, wherein the circular ring, the spring tube and the stainless steel gasket of the movable bolt assembly are sequentially connected into a whole through welding, and the stainless steel gasket, the epoxy gasket and the bolt body are connected in a threaded fit mode and coated with sealant; the circular ring, the spring tube and the stainless steel gasket being made of stainless steel; and the bolt body being made of epoxy resin, an upper end of the bolt body being cylindrical, and a lower end of the bolt body being cuboid.

3. The pressure protector for a high-voltage self-healing capacitor according to claim 1, wherein the fixed electrode body of the fixed electrode assembly and the fixed lead-out wire of the fixed electrode assembly are fastened and connected through the second fixed bolt; the fixed electrode body is made of brass, an upper end of the fixed electrode body is a cube, a middle of the fixed electrode body is a cylinder, and a bottom of the fixed electrode body is a cylinder with threads; and the fixed lead-out wire is an insulated multi-strand tinned soft copper wire.

4. The pressure protector for a high-voltage self-healing capacitor according to claim 1, wherein the movable electrode body of the movable electrode assembly, the inner connecting wire sleeved with the spring which is in a compressed state and the movable electrode are sequentially fastened and connected through the third fixed bolts, and the movable electrode body and the movable lead-out wire are also fastened and connected through one of the third fixed bolts; the movable electrode is made of brass; the movable electrode body is made of brass, and the movable electrode body is a T-shaped cylinder; and the movable lead-out wire is an insulated multi-strand tinned soft copper wire.

\* \* \* \* \*